(12) United States Patent
Ichihara et al.

(10) Patent No.: US 6,683,839 B1
(45) Date of Patent: Jan. 27, 2004

(54) STORAGE APPARATUS OFFERING IMPROVED PRECISION IN POSITIONING CARRIAGE RELATIVE TO DISK

(75) Inventors: Junichi Ichihara, Kawasaki (JP);
Shinichi Ohtsuka, Kawasaki (JP);
Hiroki Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/495,234

(22) Filed: Jan. 31, 2000

(30) Foreign Application Priority Data

Feb. 12, 1999 (JP) .......................... 11-034502

(51) Int. Cl.⁷ ............................. G11B 17/30
(52) U.S. Cl. ....................................... 369/219
(58) Field of Search ................ 369/219, 224, 369/225, 247

(56) References Cited

U.S. PATENT DOCUMENTS

| | | | | |
|---|---|---|---|---|
| 5,189,652 A | * | 2/1993 | Inoue | 369/198 |
| 5,193,080 A | * | 3/1993 | Mohri et al. | 369/244 |
| 5,278,820 A | * | 1/1994 | Shtipelman | 369/219 |
| 5,463,612 A | * | 10/1995 | Date | 369/219 |
| 5,491,684 A | * | 2/1996 | Terashima et al. | 369/219 |
| 5,526,340 A | * | 6/1996 | Tanaka | 369/219 |
| 5,532,989 A | * | 7/1996 | Getreuer et al. | 369/249 |
| 5,581,524 A | * | 12/1996 | Fujino | 369/13.02 |
| 5,745,470 A | * | 4/1998 | Nagai et al. | 369/219 |
| 5,761,183 A | * | 6/1998 | Ikegame | 369/220 |
| 5,812,517 A | * | 9/1998 | Nagasato et al. | 369/219 |
| 5,825,745 A | * | 10/1998 | Nagai | 369/219 |
| 5,875,166 A | | 2/1999 | Ikegame et al. | 369/112 |
| 5,933,406 A | * | 8/1999 | Ikegame | 369/247 |
| 5,970,037 A | * | 10/1999 | Kanazawa et al. | 369/219 |

FOREIGN PATENT DOCUMENTS

| | | |
|---|---|---|
| JP | 60191441 | 9/1985 |
| JP | 60209935 | 10/1985 |
| JP | 63-249457 | 10/1988 |
| JP | 253230 | 2/1990 |
| JP | 2-65262 | 5/1990 |
| JP | 4-106767 | 4/1992 |
| JP | 512695 | 1/1993 |
| JP | 5189784 | 7/1993 |
| JP | 5189786 | 7/1993 |
| JP | 6004886 | 1/1994 |
| JP | 6309676 | 11/1994 |
| JP | 7-021572 | 1/1995 |
| JP | 9054960 | 2/1997 |

* cited by examiner

Primary Examiner—Allen Cao
(74) Attorney, Agent, or Firm—Greer, Burns & Crain, Ltd.

(57) ABSTRACT

Provided is a storage apparatus in which the resonant frequency of carriage driving coils is high and precision in positioning a carriage is excellent. The storage apparatus is, for example, an optical disk drive having rails laid parallel to one radius of a disk, and able to read or writing data from or on the disk using a carriage movable along the rails. The carriage is moved using driving coils mounted on the flanks of the carriage and magnetic circuits each composed of a permanent magnet and yokes which are located outside the carriage. The driving coils are each shaped like a parallelepiped whose sides extending in a direction along the flank of the carriage are longer than other sides extending in a direction perpendicular to the flank. The permanent magnet or yokes of each magnetic circuit is opposed to a plane containing the long sides of each of the parallelepiped-shaped driving coils. Consequently, the rigidity of the carriage driving coils has been raised and precision in positioning the carriage has been improved.

14 Claims, 7 Drawing Sheets

STORAGE APPARATUS OFFERING IMPROVED PRECISION IN POSITIONING CARRIAGE RELATIVE TO DISK

BACKGROUND OF THE INVENTION

1. Field of the Invention

The present invention relates to a storage apparatus, or more particularly, to a storage apparatus having a carriage for reading or writing data from or on a storage medium. The storage apparatus offers improved precision in positioning a carriage relative to a storage medium because the resonant frequency of the coils for driving the carriage is high.

2. Description of the Related Art

Storage apparatus having a carriage for reading or writing data from or on a storage medium include a magneto-optical disk (hereinafter, simply, an optical disk) drive. The optical disk drive has an optical system. The optical system irradiates light emanating from a laser diode onto an optical disk that is a recording medium so that data can be recorded on the optical disk. The optical system is used to detect data in light returned from the optical disk so as to read information recorded on the optical disk. The optical system in the optical disk drive consists of a stationary optical system including a laser diode and a sensor for detecting returned light, and a movable optical system for irradiating a light beam sent from the stationary optical system to a desired track on the optical disk.

The movable optical system includes a mirror, an objective, and a carriage. The mirror changes the path of a light beam traveling from the stationary optical system towards the optical disk. The objective narrows the light beam and irradiates it onto a desired track on the optical disk. The carriage has a mechanism for focusing the objective. The carriage is movable along rails laid down in a radial direction of the optical disk, and moved along the rails when driven by a rectilinear voice coil motor.

However, in the conventional movable optical system, driving coils may resonate at a low frequency due to current flowing into the driving coils. Consequently, a frequency band in which a carriage positioning control system is actuated cannot be raised, and precision in positioning cannot be maintained. There is therefore an increasing demand for a carriage for an optical disk drive structured so that driving coils mounted on both flanks of the carriage will not resonate and the carriage can be positioned very precisely.

The movable optical system included in the conventional optical disk drive has the carriage capable of sliding along two support rails below the optical disk and movable in radial directions of an optical disk. Slide bearings are incorporated in the carriage so that the carriage can smoothly slide along the support rails. Moreover, a reflector mirror is included in a carriage body. An objective is located above the reflector mirror while supported by a support spring. The objective is driven by objective driving magnetic circuits. A light beam traveling from the stationary optical system located on an extension of a moving range within which the carriage is moved is focused on the optical disk.

Carriage driving coils each shaped like a parallelepiped are mounted on both flanks of a carriage body. A magnetic circuit composed of a first yoke having a permanent magnet and a second yoke penetrating through the driving coil is formed around each driving coil.

In the conventional optical disk drive, the driving coils are structured to be long in the direction of movement in which the carriage moves and in a direction perpendicular to the direction of movement, and to be short and flat in a direction perpendicular to the surface of the optical disk. The magnetic circuits are used to induce magnetic fields in the direction perpendicular to the surface of the optical disk. A driving force is generated in the carriage due to the Lorentz force exerted due to coil currents flowing through the driving coils and in the magnetic fields.

However, in the conventional optical disk drive, the driving coils resonate at a low frequency (5 to 6 kHz) to vibrate vertically relative to the flanks of the carriage body. Moreover, the driving coils resonate at a low frequency (5 to 6 kHz) to vibrate back and forth relative to the flanks of the carriage body. In the conventional optical disk drive, a frequency band in which a carriage positioning control system is actuated cannot be raised. This poses a problem in that precision in controlling the positioning of the carriage cannot be improved.

SUMMARY OF THE INVENTION

An object of the present invention is to provide a storage apparatus such as an optical disk drive structured to be able to raise the resonant frequency of carriage driving coils and to maintain excellent precision in positioning a carriage.

To accomplish the above object, the present invention provides a storage apparatus having support rails laid down on a plane opposed to a storage medium in a direction transverse to the tracks on the storage medium. The storage apparatus uses a carriage movable along the support rails to access the storage medium. The carriage is moved using driving coils mounted on the flanks of the carriage and magnetic circuits each composed of a permanent magnet and yokes. The driving coils are each shaped like a parallelepiped whose sides extending along the flanks of the carriage are longer than other sides extending perpendicular to the flanks of the carriage. The permanent magnet or yokes of each magnetic circuit is opposed to the plane of each parallelepiped-shaped driving coil containing the long sides.

If the length of the sides of each parallelepiped-shaped driving coil extending along the flank of the carriage is 1 and the length of the sides thereof extending perpendicular to the flank may be set to fall within 0.55 to 0.65, the rigidity of the driving coils can be improved.

Moreover, support members may be located on and under the driving coils mounted on the flanks of the carriage and thus hold the driving coils while clamping the tops and bottoms of the driving coils.

The edges of a support member on the opposite sides of each driving coil may be extended to clamp the thick portion of the driving coil on the opposite sides. Inclusion of the support members and extension of the edges of the support members lead to improvement in the rigidity of the driving coils. Moreover, a magnetic body to be attracted by the permanent magnet in the adjacent magnetic circuit may be attached to the distal ends of support members.

When the magnetic body is attached to the distal ends of support members, even if the magnetic disk drive may entirely be excited and the carriage may be accelerated, the carriage remains in contact with the rails on a stable basis. It will not take place that the carriage floats above the rails and it does not vibrate.

In addition, a reinforcement plate for linking the bottoms of the two driving coils mounted on the flanks of the carriage may be attached to the carriage.

Furthermore, ribs may be formed on the reinforcement plate.

When the reinforcement plate is attached to the carriage, the carriage is reinforced on the side of the bottom thereof. Resonance hardly occurs at a low frequency. When the ribs are formed on the reinforcement plate, the rigidity of the reinforcement plate will be further improved.

The reinforcement plate may be used to hold a flexible printed-circuit board for supplying power to electrical parts included in the carriage. In this case, the reinforcement plate acts as a holder for supporting the flexible printed-circuit board and preventing interference of the flexible printed-circuit board with other parts.

The weight of the reinforcement plate may be determined so that the center of gravity of the carriage having the reinforcement plate attached thereto will be aligned with a point at which a driving force exerted by the driving coils is applied to the carriage, in a direction of movement in which the carriage is moved. In this case, the carriage body having the reinforcement plate attached thereto can be moved smoothly in the radial direction of an optical disk.

If the reinforcement plate is made of a nonmagnetic material, the reinforcement plate will not be susceptible to the magnetic circuits.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Before describing the preferred embodiments, an explanation will be given of the conventional storage apparatus shown in FIGS. 1 to 2B.

Figure 1:
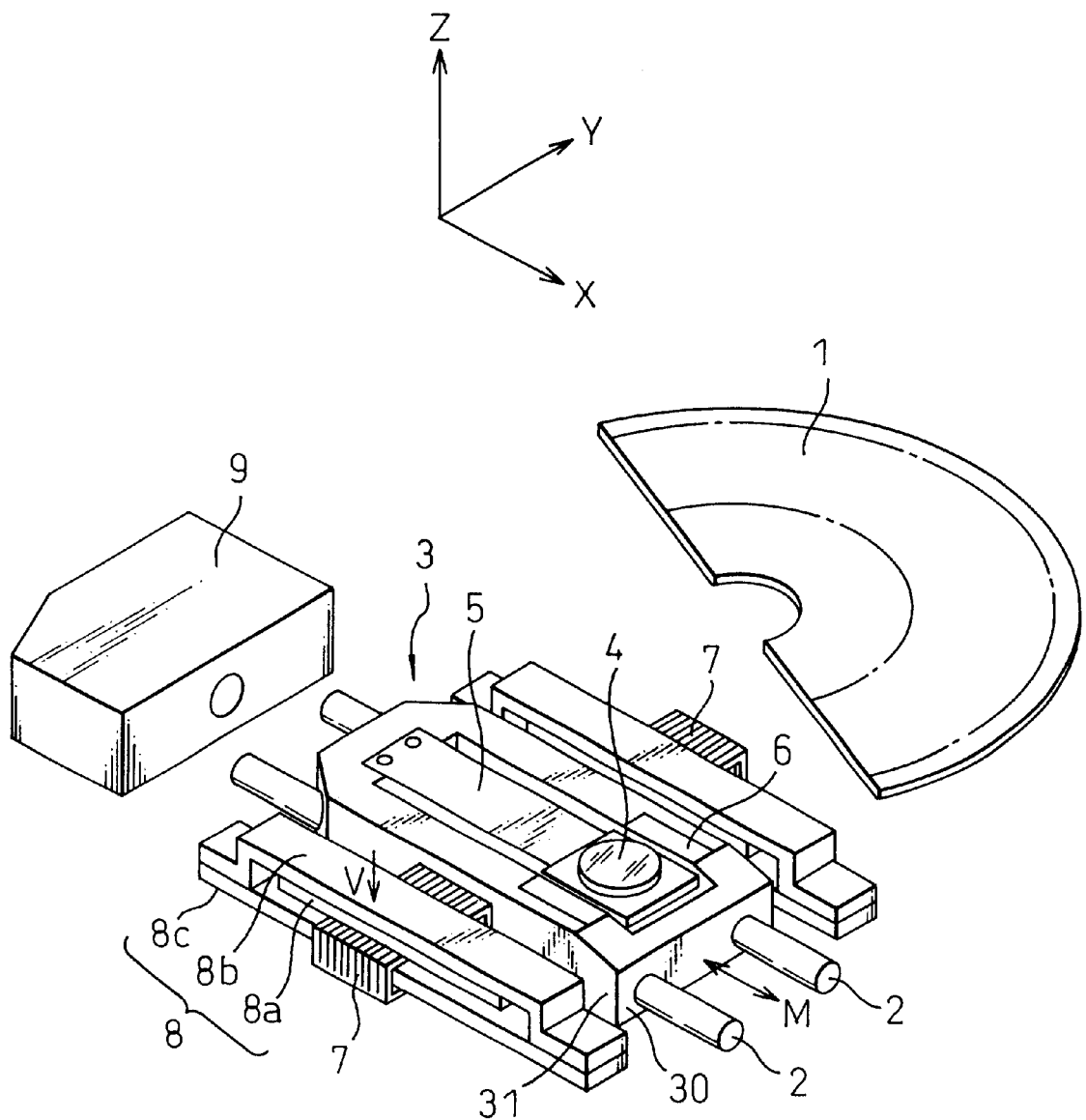
FIG. 1 is an oblique view for explaining the structure of a carriage included in a conventional optical disk drive.

FIG. 1 is used to explain the structure of a carriage that is a movable optical system of the conventional optical disk drive. Referring to FIG. 1, a carriage 3 capable of sliding along two support rails 2 and thus moving in the radial direction X of an optical disk 1 as shown by an arrow M is located below the optical disk 1. Slide bearings (not shown) are incorporated in the carriage 3 so that the carriage can slide smoothly along the support rails 2. A reflector mirror (not shown) is included in a body 30 of the carriage 3. An objective 4 is supported by a support spring 5. The objective 4 is driven using objective driving magnetic circuits 6, whereby a light beam traveling from a stationary optical system 9 is focused on the optical disk. The stationary optical system 9 is located on an extension of a moving range within which the carriage 3 can move.

Carriage driving coils 7 each shaped like a rectangle are mounted on both the flanks 31 of the body 30 of the carriage 3. Each driving coil 7 is surrounded with a magnetic circuit 8 composed of a first yoke 8b having a permanent magnet 8a and a second yoke 8c penetrating through the driving coil 7.

In the conventional optical disk drive, the driving coils 7 are structured to be long in the direction of movement X in which the carriage moves and in a direction orthogonal to the direction of movement. Moreover, the driving coils 7 are short and flat in a direction Z perpendicular to the surface of the optical disk 1. The magnetic circuits 8 are used to induce magnetic fields in a direction V perpendicular to the surface of the optical disk 1. Driving force is generated in the carriage 3 due to Lorentz force exerted due to the magnetic fields and the coil currents flowing in the driving coils 7.

Figure 2A:
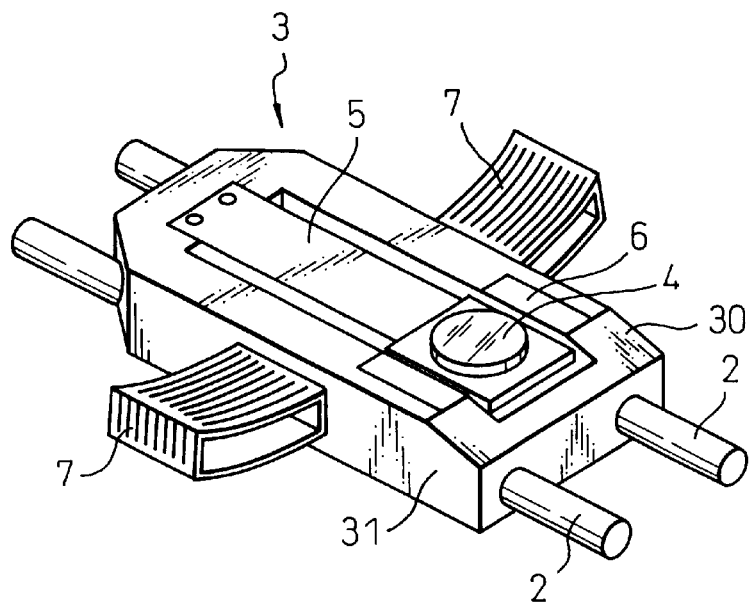
FIG. 2A and FIG. 2B are oblique views for explaining drawbacks of the carriage included in the conventional optical disk drive;.
Figure 2B:
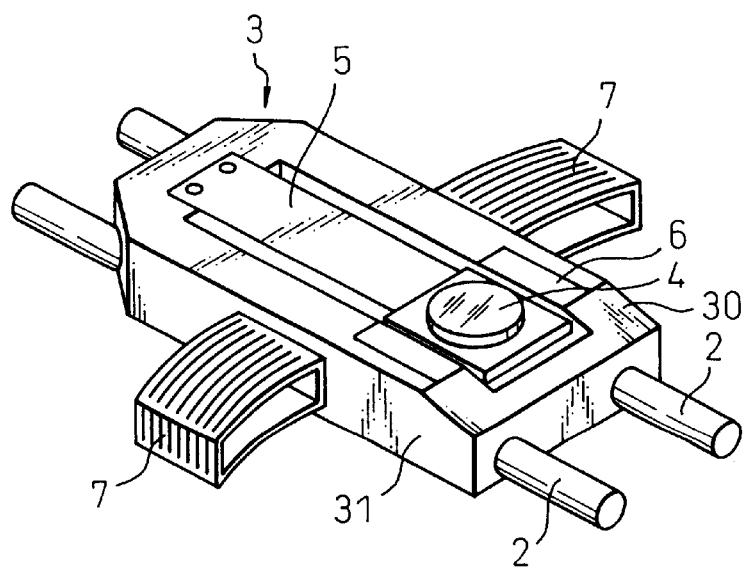

However, in the conventional magnetic disk drive having the structure shown in FIG. 1, the driving coils 7 may, as shown in FIG. 2A, resonate at a low frequency (5 to 6 kHz) to vibrate vertically relative to the flanks 31 of the carriage body 30. Otherwise, the driving coils 7 may, as shown in FIG. 2B, resonate at a low frequency (5 to 6 kHz) to vibrate back and forth relative to the flanks 31 of the carriage body 30. In the conventional magnetic disk drive, therefore, a frequency band in which a carriage positioning control system is actuated cannot be raised. This poses a problem in that precision in controlling positioning of the carriage 3 cannot be improved.

Exemplary embodiments of the present invention will be described below. In the embodiments of the present invention, the same reference numerals will be assigned to components identical to those of the conventional carriage.

Figure 3A:
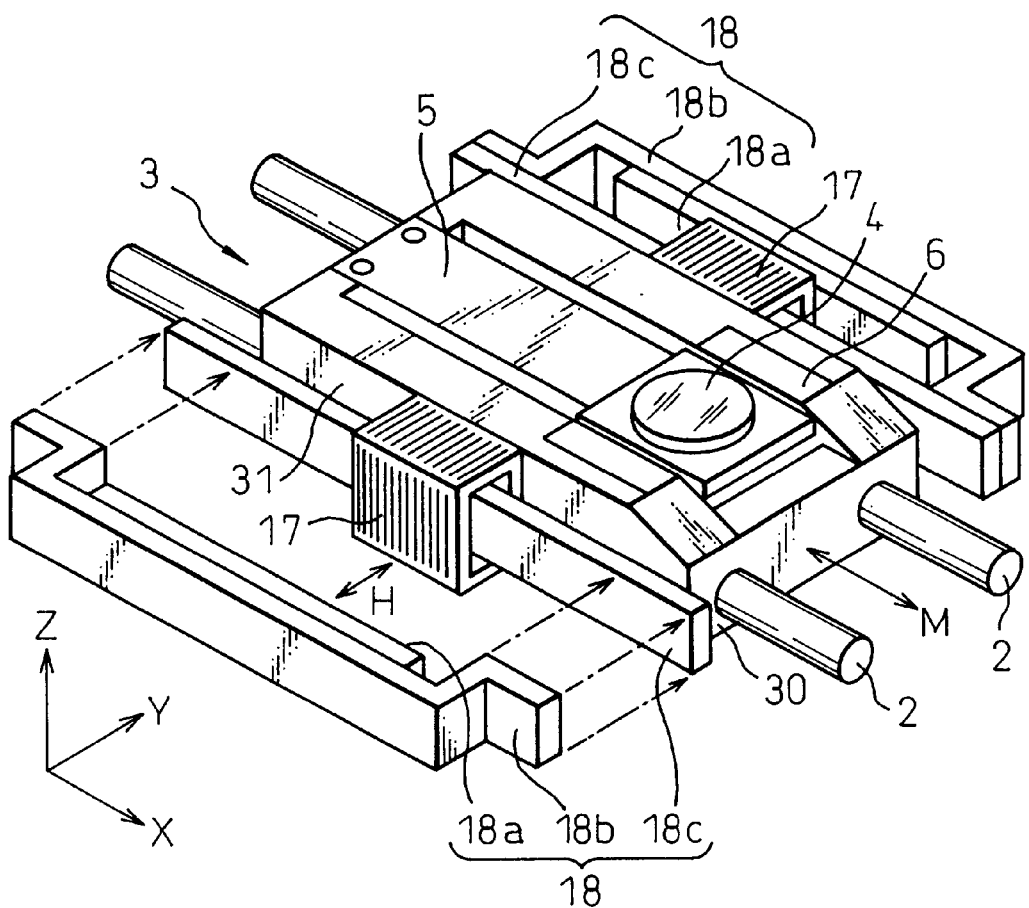
FIG. 3A is an oblique view for explaining the structure of a carriage included in an optical disk drive in accordance with the first embodiment of the present invention.
Figure 3B:
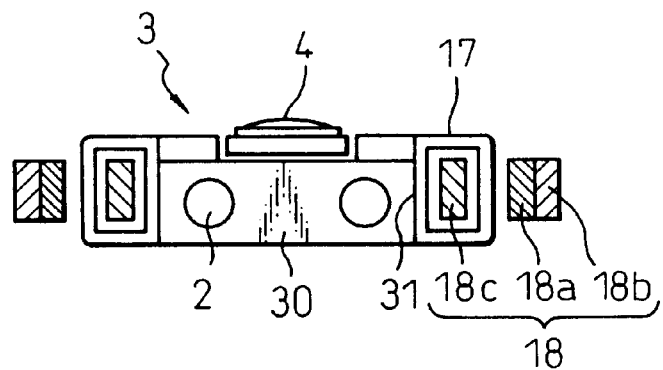
FIG. 3B is a front view showing the section of part of the carriage shown in FIG. 2A.

FIG. 3A is used to explain the structure of a carriage 3 included in an optical disk drive of the first embodiment of the present invention. FIG. 3B shows the section of part of the structure shown in FIG. 3A. The carriage 3 in accordance with the present invention is located at the same position as that included in the conventional optical disk drive. The optical disk 1 and stationary optical system 9 shown in FIG. 1 are therefore not shown in FIG. 3A.

The carriage 3 of this embodiment slides along two support rails 2 in the same manner as that in the related art, and can thus move in the radial direction (directions M) of an optical disk 1. Slide bearings (not shown) are incorporated in the carriage 3 so that the carriage can smoothly slide along the support rails 2. Moreover, a reflector mirror (not shown) is included in a body 30 of the carriage 3. An objective 4 is supported by a support spring 5 above the reflector mirror. The objective 4 is driven using objective driving magnetic circuits 6, whereby a light beam traveling from a stationary optical system (see FIG. 1) located on an extension of a moving range within which the carriage 3 is movable is focused on an optical disk.

The carriage driving coils 7 each shaped like a rectangle are mounted on the flanks 31 of the body 30 of the conventional carriage 3 described in conjunction with FIG. 1. The coils 7 are long in the direction of movement X in which the carriage 3 moves and in the direction Y perpendicular to the direction of movement, and short and flat in the direction Z perpendicular to the surface of the optical disk. In contrast, carriage driving coils 17 in the first embodiment are shaped differently from the conventional carriage driving coils 7, though the carriage driving coils 17 are mounted on the flanks 31 of the body 30 of the carriage 3 in the same manner as those in the related art. Specifically, the carriage driving coils 17 in the first embodiment are each shaped like a parallelepiped whose sides extending in the direction of movement X of the carriage 3 (radial direction of the optical disk) is long, whose sides extending the direction Y perpendicular to the direction of movement X of the carriage are short, and whose sides extending in the direction z perpendicular to the surface of-the optical disk are long.

In an exemplary embodiment, the dimensions in the X, Y, and Z directions of the carriage driving coils 17 can be set as follows:

(length in X direction)/(length in Z direction)=0.75 to 1.00    (1)

(length in Y direction)/(length in Z direction)=0.55 to 0.65    (2)

In the first embodiment, the product of expression (1) comes to 0.83, and the product of expression (2) comes to 0.60.

A magnetic circuit 18 surrounding each carriage driving coil 17 in the first embodiment is structured at an angle of 90° to the conventional magnetic circuit 8 described in conjunction with FIG. 1. In the first embodiment, a second yoke 18c penetrating each carriage driving coil 17 is opposed parallel to the flank 31 of the body 30 of the carriage 3. Moreover, a first yoke 18b having a permanent magnet 18a is joined to the outer surface of the second yoke 18c, whereby the magnetic circuit 18 is constructed.

In the optical disk drive of the first embodiment, the magnetic circuits 18 induce magnetic fields in a direction H parallel to the surface of the optical disk in the carriage driving coils 17. A driving force working in the direction of movement X of the carriage 3 is applied to the carriage 3 due to Lorentz force exerted due to the magnetic fields and coil currents flowing in the carriage driving coils 17.

In the carriage 3 in the first embodiment, the carriage driving coils 17 mounted on the flanks 31 of the carriage body 30 are long in the X direction in which they are borne by the flanks 31 and in the Z direction perpendicular to the surface of the optical disk. However, the carriage driving coils 17 are short in the Y direction in which they are not supported. Consequently, a resonance frequency at which the carriage driving coils 17 vibrate vertically relative to the flanks 31 of the carriage body 30 is 10 kHz. This is higher than the conventional resonant frequency of 5 to 6 kHz. The same applies to a resonant frequency at which the carriage driving coils 17 vibrate back and forth relative to the flanks 31 of the carriage body 30. Low-frequency resonance of the carriage driving coils 17 is minimized. In the optical disk drive using the carriage 3 of the first embodiment, a frequency band in which a control system for positioning the carriage 3 is activated can be raised. Consequently, precision in controlling positioning of the carriage 3 can be improved.

Figure 4:
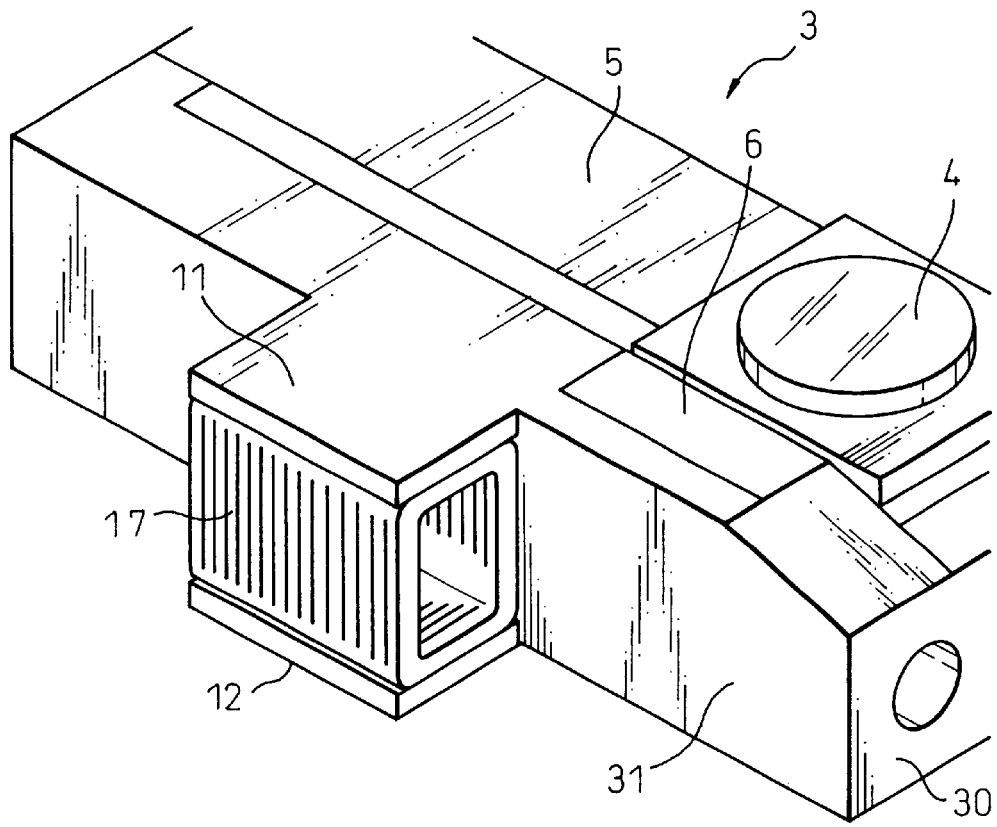
FIG. 4 is an enlarged oblique view showing a major portion of the structure of a carriage included in an optical disk drive in accordance with the second embodiment of the present invention.

FIG. 4 shows the structure of a carriage 3 included in an optical disk drive of the second embodiment of the present invention. FIG. 4 shows the major portion of the structure shown in FIG. 3A in enlargement. The magnetic circuits 18 are not shown in FIG. 4. Moreover, the same reference numerals are assigned to component members identical to those of the first embodiment.

The second embodiment is different from the first embodiment in a point that the carriage driving coils 17 in the first embodiment, which are described in conjunction with FIG. 3A and FIG. 3B, are each clamped and reinforced with two support plates 11 and 12. The two support plates 11 and 12 clamp the top and bottom of each carriage driving coil 17 to hold the carriage driving coil 17. The support plates are placed on and under the carriage driving coils 17 mounted on the carriage body 30. The support plates 11 and i2 can be realized with projections projecting from the flanks 31 of the carriage body 30. For example, when the carriage body 30 is molded using a resin, the support plates 11 and 12 can be formed as integral parts of the carriage body 30.

The support plates 11 alone may be made of a resin as integral parts of the carriage body 30, while the support plates 12 may be formed as separate members and mounted on the bottom of the carriage body 30. In this case, the support plates 12 should be formed with one plate extending from the right carriage driving coil 17 of the carriage 3 to the left carriage driving coil 17 thereof. The support plates 11 and 12 may be fixed to the tops and bottoms of the carriage driving coils 17 using an adhesive, whereby the carriage driving coils 17 can be firmly fixed to the flanks 31 of the carriage 3.

According to the second embodiment, the tops and bottoms of the carriage driving coils 17 are clamped using the support plates 11 and 12. The vertical vibrations of the carriage driving coils 17 can therefore be suppressed. Moreover, when the support plates 11 and 12 are joined to the tops and bottoms of the carriage driving coils 17 using an adhesive, the back-and-forth. vibrations of the carriage driving coils 17 can also be suppressed. An experiment has demonstrated that the resonant frequency becomes higher by 1 kHz in the second embodiment than that in the first embodiment. Compared with the first embodiment, the second embodiment can improve the rigidity of the carriage driving coils 17.

Figure 5:
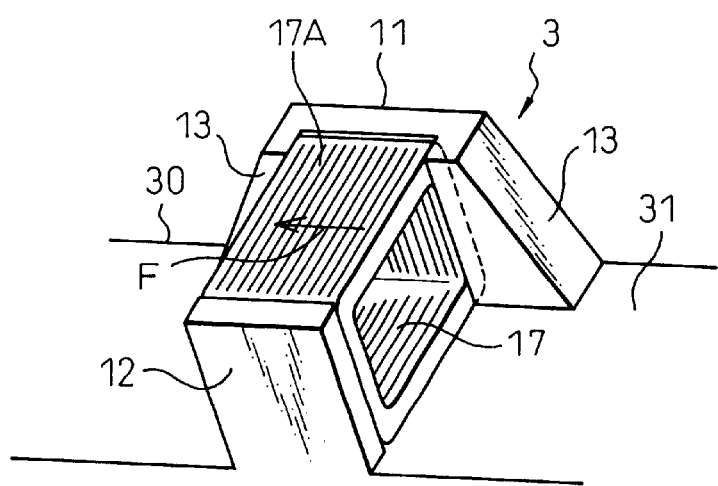
FIG. 5 is an enlarged oblique view showing a major portion of the structure of a carriage included in an optical disk drive in accordance with the third embodiment of the present invention.

FIG. 5 shows the structure of a carriage 3 included in an optical disk drive of the third embodiment of the present invention. The same carriage driving coil 17 as that mounted on the flank 31 of the carriage 31 shown in FIG. 3 is seen from the back of the carriage. The illustration of the magnetic circuits 18 of the third embodiment is omitted. Moreover, the same reference numerals are assigned to components identical to those in the first and second embodiments.

In the third embodiment, the shape of the two support plates 11 and 12 clamping each carriage driving coil 17 is different from that of those in the second embodiment described in conjunction with FIG. 4. In the second embodiment, the two support plates 11 and 12 merely clamp the top and bottom of each carriage driving coil 17. In the third embodiment, the right and left edges of the support plate 11 on the free edges of the carriage driving coil 17 are extended towards the carriage driving coil 17 and are thus provided with extensions 13. When the carriage body 30 is molded using a resin, the extensions 13 can be formed together with the support plate 11. Even in the third embodiment, the support plates 11 alone may be made of a resin as integral parts of the carriage body 30, while the support plates 12 may be formed with one separate plate and mounted on the bottom of the carriage body 30.

The extensions 13 are, in this embodiment, shaped to have a trapezoidal section. Alternatively, the thickness of each support plate 11 may remain unchanged and the extensions 13 may be shaped to have a square section. Moreover, the length of the extensions 13 formed on both edges of the support plate 11 is set to a value permitting the extensions 13 to remain untouched by the second yoke 18c of the magnetic circuit 18 passing through the inner space (magnetic path) of each carriage driving coil 17. Each support plate 11 should therefore be extended to cover the corners of each carriage driving coil 17 while not interfering with the magnetic path of the carriage driving coil 17. In the third embodiment, the support plates 11 and 12 need not be fixed to the tops and bottoms of the carriage driving coils 17 using an adhesive.

In the third embodiment, similarly to the second embodiment, the vertical and back-and-forth vibrations of the carriage driving coils 17 can be suppressed. Compared with the first embodiment, the third embodiment can further improve the rigidity of the carriage driving coils 17.

Figure 6:
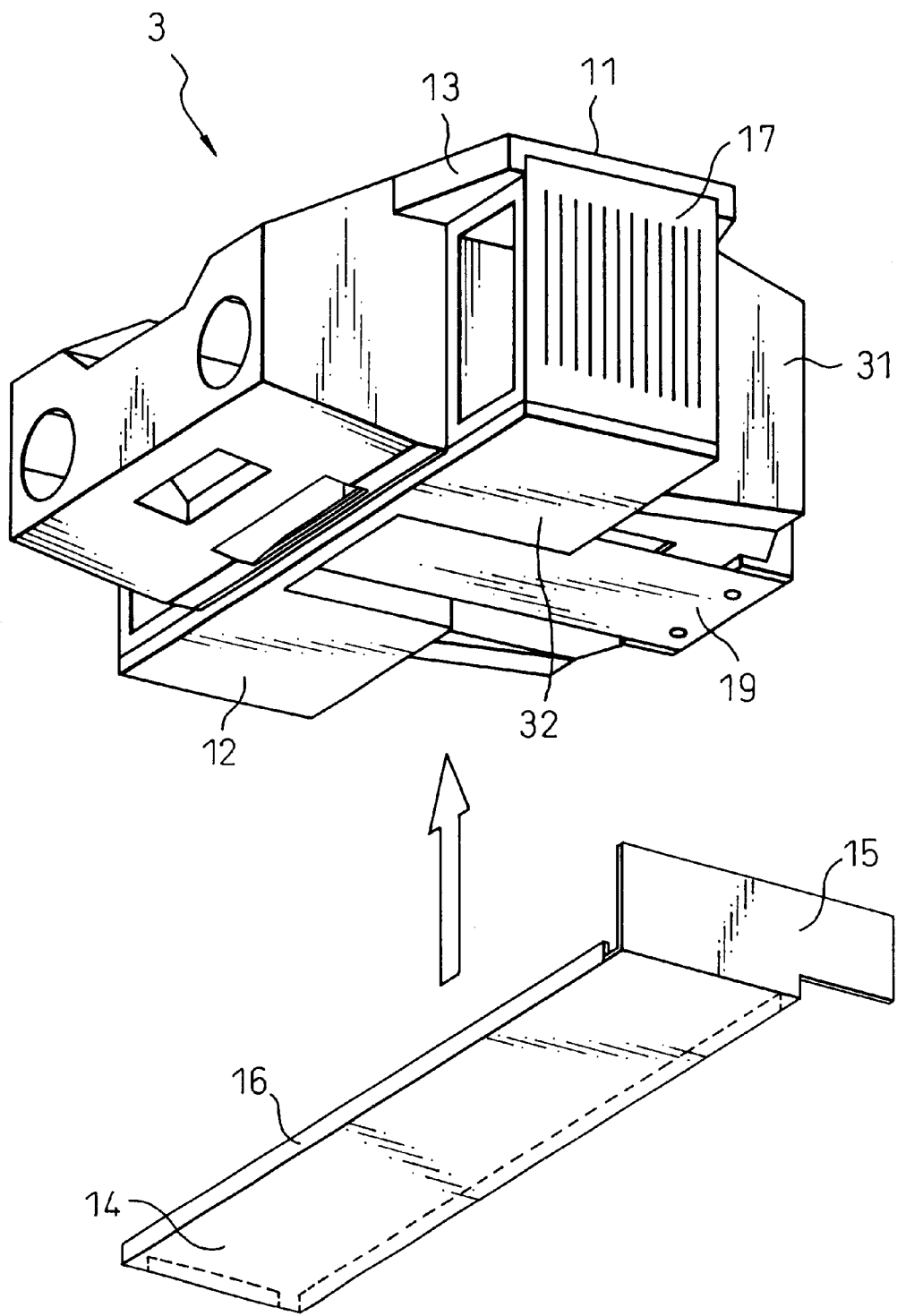
FIG. 6 is an oblique view showing the structure of a carriage included in an optical disk drive in accordance with the fourth embodiment of the present invention with a component being attached to an assembly.

FIG. 6 shows the structure of a carriage 3 included in an optical disk drive of the fourth embodiment of the present invention. The magnetic circuits 18 of the fourth embodiment are not shown. Moreover, the same reference numerals are assigned to component members identical to those of the first to third embodiments. The fourth embodiment can be implemented in any of the carriages 3 of the first to third embodiments. FIG. 6 shows the carriage 3 of the third embodiment. A blade spring 19 supports an objective. The support plates 11 and 12 are placed on and under the carriage driving coils 17 mounted on the flanks 31 of the carriage 3. The extensions 13 are formed at both edges of each support plate 11.

In the fourth embodiment, a link plate 14 for reinforcement (Hereinafter referred to as a reinforcement plate 14) is linking the bottoms of the two carriage driving coils 17 mounted on the flanks 31 of the carriage body 30, and attached to the bottom 32 of the carriage body 30. The reinforcement plate 14 is formed with one plate linking the bottoms of the carriage driving coils 17. In the fourth embodiment, one edge of the reinforcement plate in a longitudinal direction thereof is bent as a bent portion 15. Moreover, the other edges of the reinforcement plate 14 are bent as ribs. The reinforcement plate 14 is therefore difficult to bend in a longitudinal direction.

According to the fourth embodiment, the carriage 3 is reinforced on the bottom side thereof. Low-frequency resonance will therefore hardly occur. The carriage 3 of the fourth embodiment is the carriage of the third embodiment having the reinforcement plate 14 mounted thereon. Compared with the carriage 3 of the second embodiment, the resonant frequency of the coils is higher by 1 kHz or more.

Figure 7A:
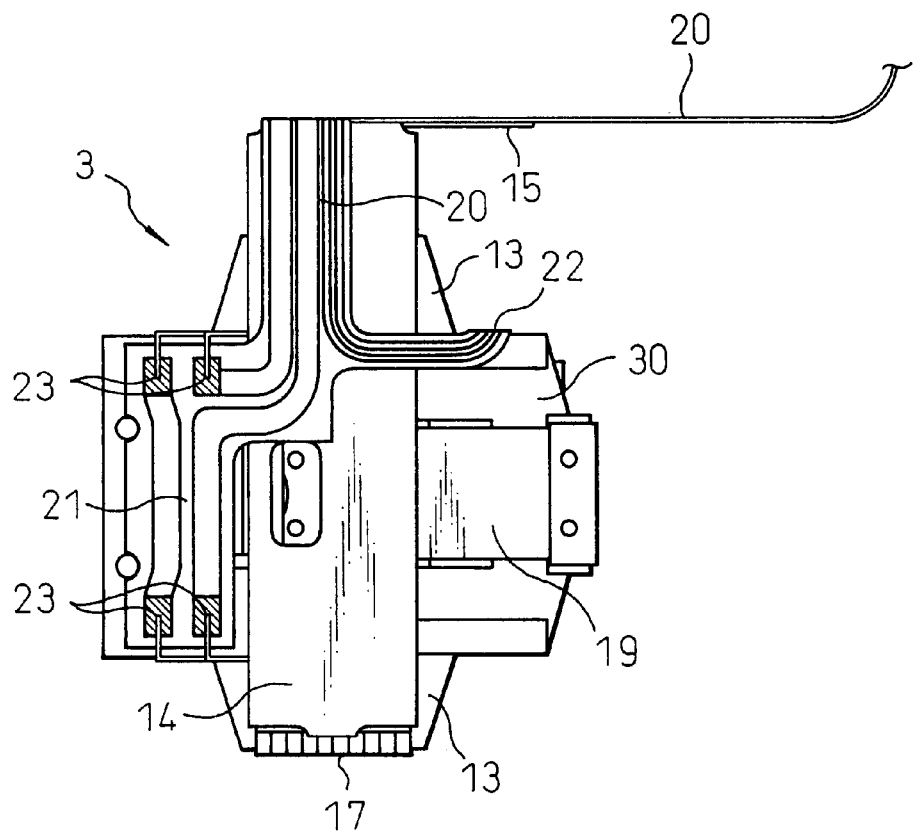
FIG. 7A is a bottom view showing the Structure of a carriage included in an optical disk drive in accordance with the fifth embodiment of the present invention.
Figure 7B:
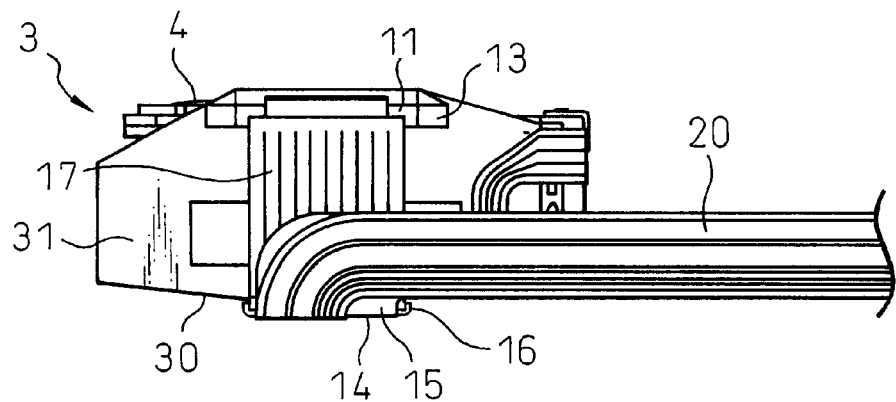
FIG. 7B is a side view showing the structure of the carriage included in the optical disk drive in accordance with the fifth embodiment of the present invention.

FIG. 7A and FIG. 7B show the structure of a carriage 3 included in an optical disk drive of the fifth embodiment of the present invention. FIG. 7A shows the carriage 3 on the bottom side thereof, and FIG. 7B shows it on the flank side thereof. The magnetic circuits 18 of the fifth embodiment are not shown. Moreover, the same reference numerals are assigned to component members identical to those of the first to fourth embodiments.

In the fifth embodiment, the reinforcement plate 14 of the fourth embodiment is used to hold a flexible printed-circuit board 20 for supplying power to the magnetic circuits (not shown) for driving the carriage driving coils 17 and the objective 4. The distal part of the flexible printed-circuit board 20 is bifurcated into a printed-circuit board 21 for driving the coils and a printed-circuit board 22 for driving the objective. Lands 23 on which the ends of the windings constituting the carriage driving coils 17 are soldered are formed on the printed-circuit board 21 for driving the coils.

The flexible printed-circuit board 20 is bent with part thereof held on the reinforcement plate 14. The bent portion of the flexible printed-circuit board 20 is connected to a control circuit that is not shown with part thereof held on the bent portion 15.

As mentioned above, the reinforcement plate 14 acts as a holder for holding the flexible printed-circuit board 20 and preventing interference with any other part.

The aforesaid carriage 3 included in the optical disk drive is a type of a uniaxial rectilinear positioning mechanism. A point of application at which driving force is applied to the carriage 3 and the center of gravity of the carriage 3 may not be aligned with each other in a direction of movement in which the carriage 3 moves. In this case, a couple of the force composed of the driving force and inertia acts on the carriage 3. Consequently, the carriage 3 is unnecessarily excited to resonate in a rotation mode. This poses a problem in that precision in positioning the carriage 3 deteriorates.

The reinforcement plate 14 described in relation to the fourth embodiment can act as a balancer for aligning the center of gravity of the carriage 3 with the driving point. The major portion of the carriage 3 is molded using a resin. Once a mold is produced, it takes a numerous man-hour and much cost to modify the mold. There is difficulty in changing the center of gravity of the carriage 3 by modifying the shape of the carriage 3. In this case, the reinforcement plate 14 may be attached to the carriage 3 afterward in order to adjust the center of gravity of the whole carriage. The carriage 3 may thus be balanced afterward.

The weight of the reinforcement plate 14 may be set so that the center of gravity of the carriage body 30 having the reinforcement plate 14 attached to the bottom 32 of the carriage body 30 will be aligned with the point of application, at which driving force exerted by the carriage driving coils 7 is applied to the carriage body 30, in a radial direction of an optical disk. Once the point of application of driving force to the carriage 3 and the center of gravity of the carriage 3 are aligned with each other in the direction of movement of the carriage 3, the carriage body 30 having the reinforcement plate 14 attached thereto can be moved smoothly in the radial directions of the optical disk.

The reinforcement plate 14 may also act as a holder for holding the flexible printed-circuit board 20. In this case, attraction occurs between the reinforcement plate 14 and the magnetic circuits for driving the objective 4 mounted in the carriage 3. The attraction may prevent the carriage 3 from moving normally. The reinforcement member 14 should therefore be made of a nonmagnetic material.

The support plates 11 and 12 may be placed on and under the carriage driving coils 17 as they are in the third embodiment described in conjunction with FIG. 5. The extensions 13 may be formed on the opposite edges of each support plate 11. Even in this case, driving force working in a direction F is applied to the bare surface 17A of each carriage driving coil 17 due to interaction with the magnetic circuits. The driving force F may cause the carriage driving coil 17 to deform and resonate. In this case, despite the inclusion of the support plates 11 and 12, the bare surfaces 17A of the carriage driving coils 17 may vibrate. Consequently, a frequency band in which a control system is actuated may be limited and precision in positioning may deteriorate.

If the above occurs, the bare surfaces 17A of the carriage driving coils 17 may be permeated with an adhesive and thus reinforced. When the bare surfaces 17A of the carriage driving coils 17 are permeated with an adhesive and thus reinforced, the carriage driving coils 17 will hardly deform vertically.

Figure 8A:
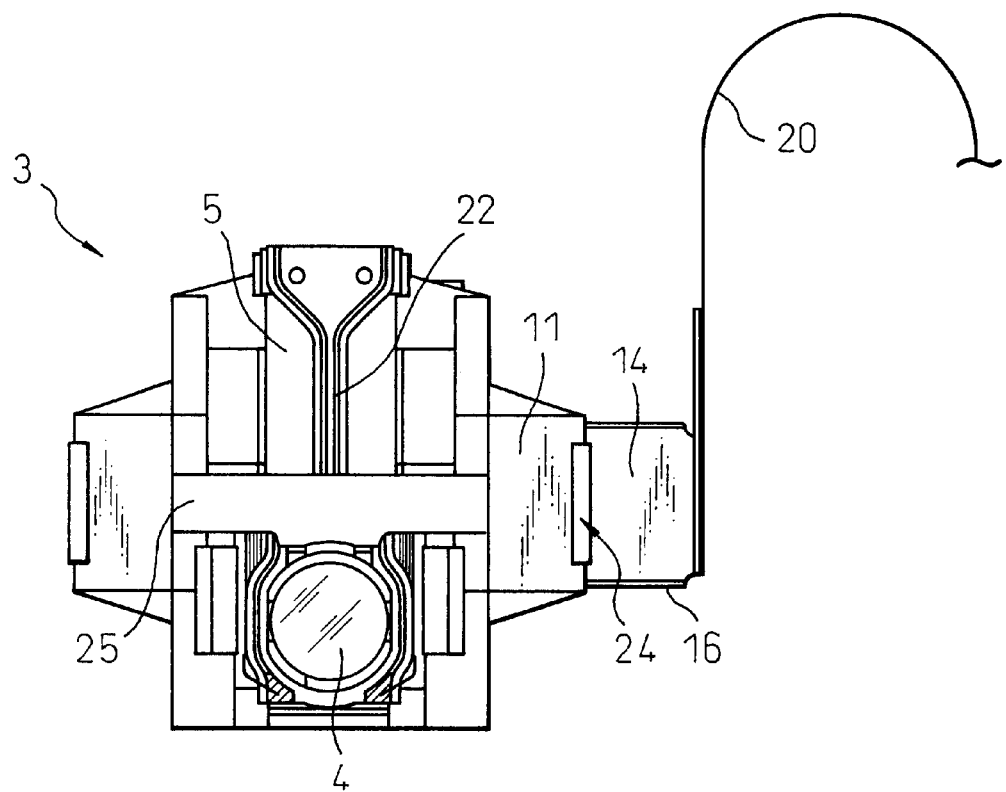
FIG. 8A is a plan view showing the structure of a carriage included in an optical disk drive in accordance with the sixth embodiment of the present invention.
Figure 8B:
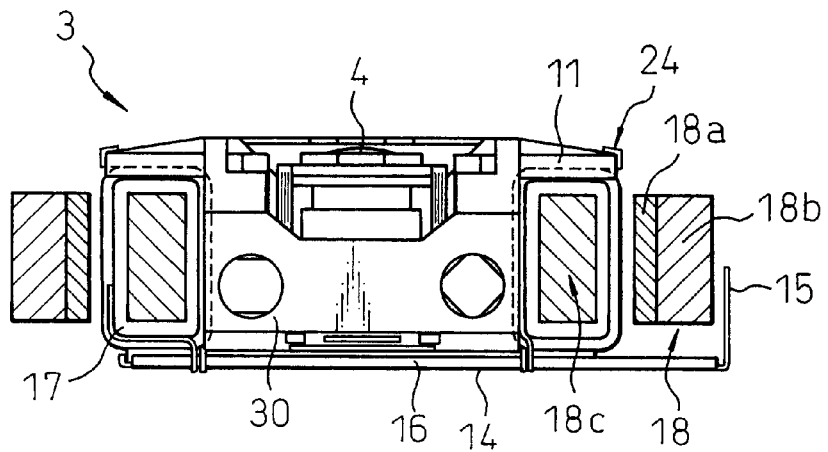
FIG. 8B is a front view showing the structure of the carriage included in the optical disk drive in accordance with the sixth embodiment of the present invention.

FIG. 8A and FIG. 8B show the structure of a carriage 3 included in an optical disk drive of the sixth embodiment of the present invention. FIG. 8A is a plan view of the carriage 3, and FIG. 8B is a front view of the carriage 3. For the sixth embodiment, FIG. 8A does not show the magnetic circuits 18. The same reference numerals are assigned to component members identical to those of the first to fifth embodiments.

In the sixth embodiment, a magnetic body 24 is attached to the distal parts of the support plates 11 of any of the second to fifth embodiments. The magnetic bodies 14 are attracted by the permanent magnets 18c of the adjacent magnetic circuits 18, so that the carriage is constrained to move downward in the drawing. Owing to the attracting force between the magnetic bodies 14 and the permanent magnets 18c, the surfaces of the slide bearings incorporated in the carriage are forced to come into contact with the two support rails 2. Consequently, even when the disk drive is severely vibrated and the carriage 3 is accelerated, the slide bearings and rails 2 remain in stable contact. The carriage 3 is prevented from floating above the rails 2 and vibrating. Referring to FIG. 8A, a stopper 25 prevents an actuator, which drives the objective 4, from popping up.

In the aforesaid embodiments, the carriage body 30 and carriage driving coils 17 are produced separately and assembled using an adhesive. When the carriage body 30 is molded using a resin, the carriage driving coils 17 may be placed as inserts in a mold and thus formed as integral parts of the carriage body 30. In this case, the gaps between the carriage driving coils 17 and carriage body 30 are fully filled with a resin. The carriage driving coils 17 and the carriage body 30 are firmly coupled to one another. Moreover, the aforesaid approaches to improvement in rigidity of the coils can be implemented in a thus constructed carriage.

The aforesaid embodiments are embodiments of an optical disk drive serving as a storage apparatus. The present invention can be effectively implemented in a storage apparatus in which a carriage moves on rails laid down parallel to a storage medium.

What is claimed is:

1. A storage apparatus having support rails laid down on a plane opposed to a storage medium in a direction transverse to the tracks on the storage medium, and accessing the storage medium using a carriage movable along the support rails, comprising:

driving coils mounted on a plurality of flanks of said carriage for driving said carriage; and magnetic circuits each composed of a permanent magnet and yokes;

said driving coils are each shaped like a rectangular parallelepiped whose sides extending in a direction along the flanks of said carriage are longer than other sides extending in a direction perpendicular to the flank; and said permanent magnet or yokes of each of said magnetic circuits is opposed to a plane containing the long sides of each of said rectangular parallelepiped-shaped driving coils;

wherein support members for holding said driving coils are placed on and under said driving coils mounted on said flanks of said carriage in order to thus clamp the tops and bottoms of said driving coils;

wherein said support members completely cover a surface area of said driving coils.

2. A storage apparatus according to claim 1 wherein the length of the sides of each of said rectangular parallelepiped-shaped driving coils extending in the direction perpendicular to the flank of said carriage falls within 0.55 to 0.65 of the length of the sides of each of said rectangular parallelepiped-shaped driving coils extending in the direction along the flank of said carriage.

3. A storage apparatus according to claim 1, wherein the edges of each of said support members on the opposite sides of each of said driving coils are extended to clamp the thick portion of the driving coil on the opposite sides thereof.

4. A storage apparatus according to claim 1, wherein a magnetic body is attached to each of the distal edges of said support members to stabilize the carriage.

5. A storage apparatus according to claim 1, wherein a link plate is attached to said carriage to link the bottoms of said driving coils mounted on the flanks of said carriage.

6. A storage apparatus according to claim 5, wherein said link plate has ribs formed for improving the rigidity of said link plate.

7. A storage apparatus according to claim 6, wherein said link plate holds a flexible printed-circuit board for supplying power to electrical parts incorporated in said carriage.

8. A storage apparatus according to claim 5, wherein the weight of said link plate is set so that the center of gravity of said carriage having said link plate attached thereto will be aligned with the point at which a driving force exerted by said driving coils is applied to said carriage, in a direction of movement in which said carriage moves.

9. A storage apparatus according to claim 5, wherein said link plate is made of a nonmagnetic material.

10. A storage apparatus according to claim 1 wherein said support members are formed as integral parts of the carriage by resin molding.

11. A storage apparatus according to claim 1 wherein said support members includes an upper and lower support members as separate members respectively on a top and bottom surface of said carriage driving coils.

12. A storage apparatus according to claim 1 wherein said support members are elongated support plates covering a top and bottom surface of said carriage driving coils.

13. A storage apparatus having support rails laid down on a plane opposed to a storage medium in a direction transverse to the tracks on the storage medium, and accessing the storage medium using a carriage movable along the support rails, comprising:

driving coils mounted on a plurality of flanks of said carriage for driving said carriage; and magnetic circuits each composed of a permanent magnet and yokes;

said driving coils are each shaped like a rectangular parallelepiped whose sides extending in a direction along the flanks of said carriage are longer than other sides extending in a direction perpendicular to the flank; and said permanent magnet or yokes of each of said magnetic circuits is opposed to a plane containing the long sides of each of said rectangular parallelepiped-shaped driving coils;

wherein support members for holding said driving coils are placed on and under said driving coils mounted on said flanks of said carriage in order to thus clamp the tops and bottoms of said driving coils;

wherein at least one of said support members further comprises an extension that extends from a free edge of said driving coils towards a portion of said driving coils.

14. A storage apparatus according to claim 13 wherein said extension is of a trapezoidal shape.

* * * * *

UNITED STATES PATENT AND TRADEMARK OFFICE
CERTIFICATE OF CORRECTION

PATENT NO. : 6,683,839 B1
DATED : January 27, 2004
INVENTOR(S) : Ichihara et al.

It is certified that error appears in the above-identified patent and that said Letters Patent is hereby corrected as shown below:

Column 9,
Line 46, after "said carriage; and" begin a new paragraph.

Column 10,
Line 16, delete "6" and insert -- 5 -- therefor.

Signed and Sealed this

Twenty-seventh Day of July, 2004

JON W. DUDAS
*Acting Director of the United States Patent and Trademark Office*